US007336188B2

(12) United States Patent
Singer et al.

(10) Patent No.: US 7,336,188 B2
(45) Date of Patent: Feb. 26, 2008

(54) SYSTEM AND METHOD FOR ENSURING LOCATION OF AN INDIVIDUAL WITHIN A DESIGNATED AREA

(75) Inventors: Michael H. Singer, Concord, NH (US); Douglas H. Richard, Tilton, NH (US)

(73) Assignee: Secure Care Products, Inc., Concord, NH (US)

( * ) Notice: Subject to any disclaimer, the term of this patent is extended or adjusted under 35 U.S.C. 154(b) by 195 days.

(21) Appl. No.: 11/251,524

(22) Filed: Oct. 14, 2005

(65) Prior Publication Data

US 2007/0085691 A1 Apr. 19, 2007

(51) Int. Cl.
*G08B 23/00* (2006.01)
*G08B 21/00* (2006.01)
*H04Q 7/00* (2006.01)

(52) U.S. Cl. .............................. 340/573.1; 340/539.11; 340/539.12; 340/539.13; 340/539.15; 340/652; 340/660

(58) Field of Classification Search ..................... None
See application file for complete search history.

(56) References Cited

U.S. PATENT DOCUMENTS

| | | | | |
|---|---|---|---|---|
| 5,189,395 A * | 2/1993 | Mitchell | ................ | 340/539.11 |
| 5,204,670 A * | 4/1993 | Stinton | ....................... | 340/10.5 |
| 5,652,570 A * | 7/1997 | Lepkofker | ............... | 340/573.4 |
| 5,742,233 A * | 4/1998 | Hoffman et al. | ......... | 340/573.1 |
| 2007/0026842 A1* | 2/2007 | Haave et al. | ............ | 455/404.2 |

* cited by examiner

*Primary Examiner*—Julie Lieu
(74) *Attorney, Agent, or Firm*—Hayes Soloway PC

(57) ABSTRACT

A system and method for ensuring that a monitored individual is located within a designated area is provided. The system contains a monitoring band having a transmitter capable of transmitting a signal. A transceiver interface unit is also located within the system, which is capable of receiving the signal and determining if the signal is a signal indicating that the monitoring band has been cut or a signal indicating that the transmitter on the monitoring band is functional. The system also contains a monitoring station capable of performing an event if the monitoring station receives the cut-band signal, or if the monitoring station is monitoring the monitoring band, performing the event if the polling signal is not received by the monitoring station within a predefined period of time.

18 Claims, 6 Drawing Sheets

SYSTEM AND METHOD FOR ENSURING LOCATION OF AN INDIVIDUAL WITHIN A DESIGNATED AREA

FIELD OF THE INVENTION

The present invention is generally related to security, and more particularly, is related to ensuring location of an individual within a designated area.

BACKGROUND OF THE INVENTION

Ensuring location of an individual or item within a designated area is often of major concern to medical facilities. Certain medical conditions require constant monitoring of the individual to ensure proper health. In addition, certain medical conditions of individuals may affect the memory of the individuals, thereby requiring monitoring of the location of individuals at all times to prevent the individuals from leaving the facility and becoming lost. An example of such an illness is Alzheimer's disease.

In addition, medical equipment is a shared resource and knowing location saves time. Specifically, since most medical equipment is mobile and could be in a number of locations, the ability to keep unwarranted removal of medical equipment maintains the medical equipment to designated areas and is a deterrent to theft.

Further, medical facilities having a maternity ward hold babies within the maternity ward while performing different medical procedures to ensure that the child is healthy and in condition to proceed home with his/her new family. While in the maternity ward, babies are typically provided with a band having a transmitter thereon that is capable of being detected if the baby is carried past a predetermined area. As an example, a detector may be located on the outside of a door to the maternity ward so that if a baby is carried outside of the maternity ward, the transmitter on the baby is detected and an alarm may be sounded.

Unfortunately, it is quite common that a band that has been secured to a baby for the above-mentioned security purposes, falls off of the baby. As an example, the band may be too loose, or, through movement of the baby, the band may fall off. In addition, a nurse securing the band to the baby may not have secured a clasp correctly and the band may simply fall off of the baby. Further, someone may remove the band intentionally so as to be able to remove the baby from the maternity ward without notification to security by the alarm. Unfortunately, if the band falls off of the baby, the only way to ensure location of the baby within the maternity ward is through sight.

To address the problem of band removal, facilities such as the maternity ward quite often have entry and exit points locked at all times. While entry and exit points of the facility may be locked at all times, individuals seeking entry into the maternity ward may gain entry by many different methods, such as, holding a door open before it shuts, stealing or replicating a security card to access the room, or forcing their way into the maternity ward.

Thus, a heretofore unaddressed need exists in the industry to address the aforementioned deficiencies and inadequacies.

SUMMARY OF THE INVENTION

Embodiments of the present invention provide a system and method for ensuring location of an individual or equipment within a designated area. Briefly described, in architecture, one embodiment of the system, among others, can be implemented as follows. The system contains a monitoring band having a transmitter capable of transmitting. A transceiver interface unit is also located within the system, which is capable of receiving the signal and determining if the signal is a signal indicating that the monitoring band has been cut or a signal indicating that the transmitter on the monitoring band is functional. The system also contains a monitoring station capable of performing an event if the monitoring station receives the cut-band signal, or if the monitoring station is monitoring the monitoring band, performing the event if the polling signal is not received by the monitoring station within a predefined period of time.

The present invention can also be viewed as providing methods for insuring that an individual or object is located within a designated area. In this regard, one embodiment of such a method, among others, can be broadly summarized by the following steps: determining if a received signal is a signal indicating that a monitoring band attached to the individual or object has been cut, hereafter referred to as a cut-band signal, or if the received signal is a signal indicating that the monitoring band is functional, hereafter referred to as a received polling signal; notifying authorities if the received signal is a cut-band signal; determining a number of times that a polling signal having a unique identification similar to a unique identification stored within the received polling signal has been received, if the received signal is a received polling signal; monitoring the monitoring band for a polling signal having the unique identification, if the number of times that a polling signal having the unique identification exceeds a predefined number; and notifying the authorities if a polling signal having the stored unique identification is not received within a predefined period of time, if monitoring the monitoring band.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present system and method is intended to assist in ensuring that a band is not removed from an individual being monitored. The following description provides the example of the system and method being used in a maternity ward of a hospital to assist in ensuring location of a baby within the maternity ward. It should be noted, however, that the present system and method may instead be utilized at a private or public facility, and on babies or adults. In addition, while the following describes monitoring of a single individual, one having ordinary skill in the art will appreciate that the present system and method may be used for monitoring multiple individuals or to ensure that items, instead of individuals, are monitored. For example, radioactive material can be stored in a facility within a container that also has a monitoring band connected to the container. By use of the present system and method, a responsible party could ensure that the radioactive material is not removed from the facility since, as is explained in detail below, removal of the band from the facility would prevent receipt of a polling signal from the band, thereby causing sounding of an alarm. Further description of the system and method is provided below in detail.

Figure 1:
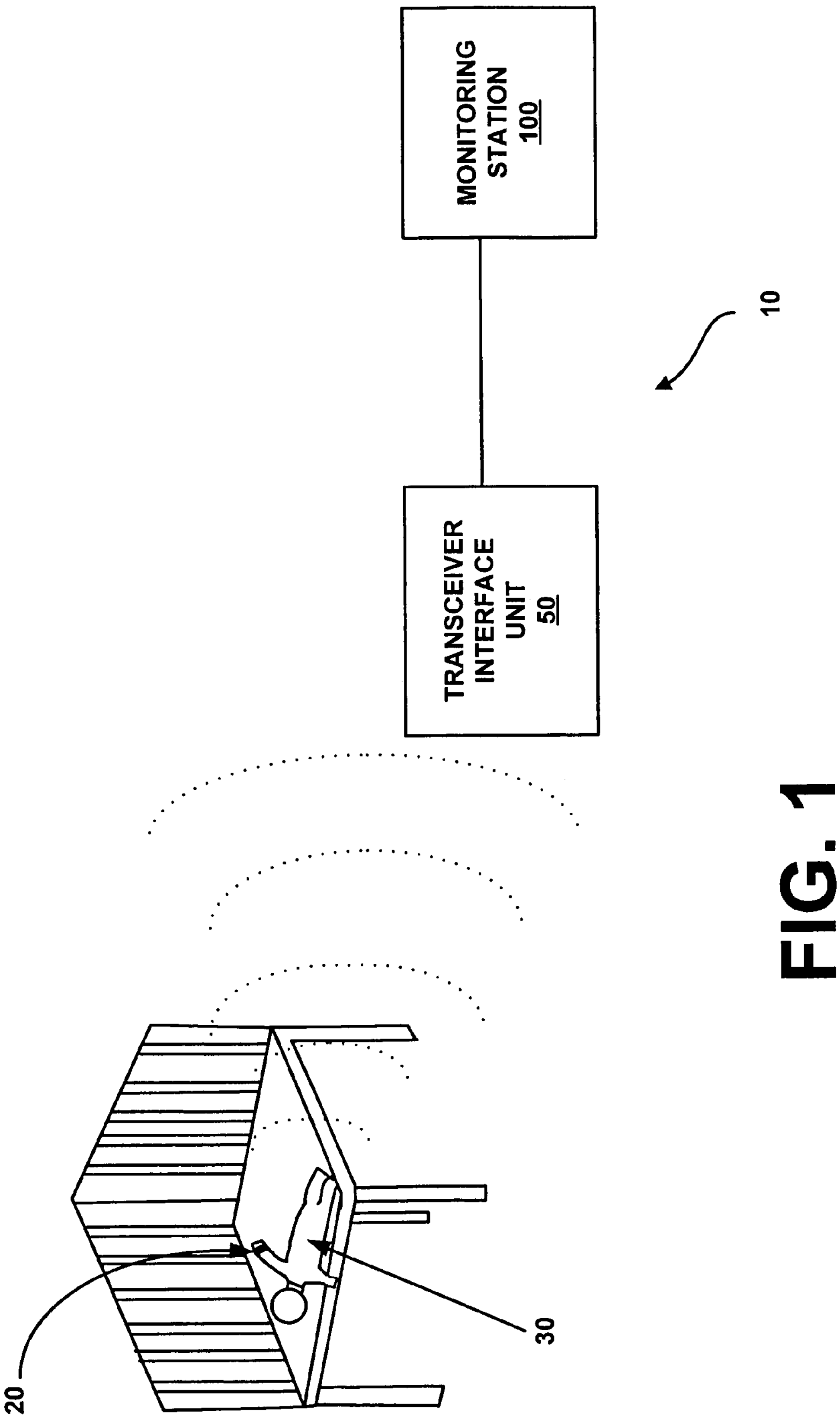
FIG. 1 is a block diagram illustrating general interaction of components of a monitoring system, in accordance with a first exemplary embodiment of the invention.

FIG. 1 is a block diagram illustrating general interaction of components of a monitoring system 10, in accordance with a first exemplary embodiment of the invention. As is shown by FIG. 1, the monitoring system 10 contains numerous portions. The monitoring system 10 contains a monitoring band 20 that is connected to a baby 30, a transceiver interface unit (TIU) 50, and a monitoring station 100. The monitoring band 20 may be located on different parts of the baby 30, the present example showing location on the wrist of the baby 30. Communication between the monitoring band 20 and the TIU 50 is preferably provided via wireless communication, while communication between the TIU 50 and the monitoring station 100 is preferably provided via a wired communication link. It should be noted, however, that communication between different portions of the monitoring system 10 may be provided via wireless or wired communication means.

Figure 2:
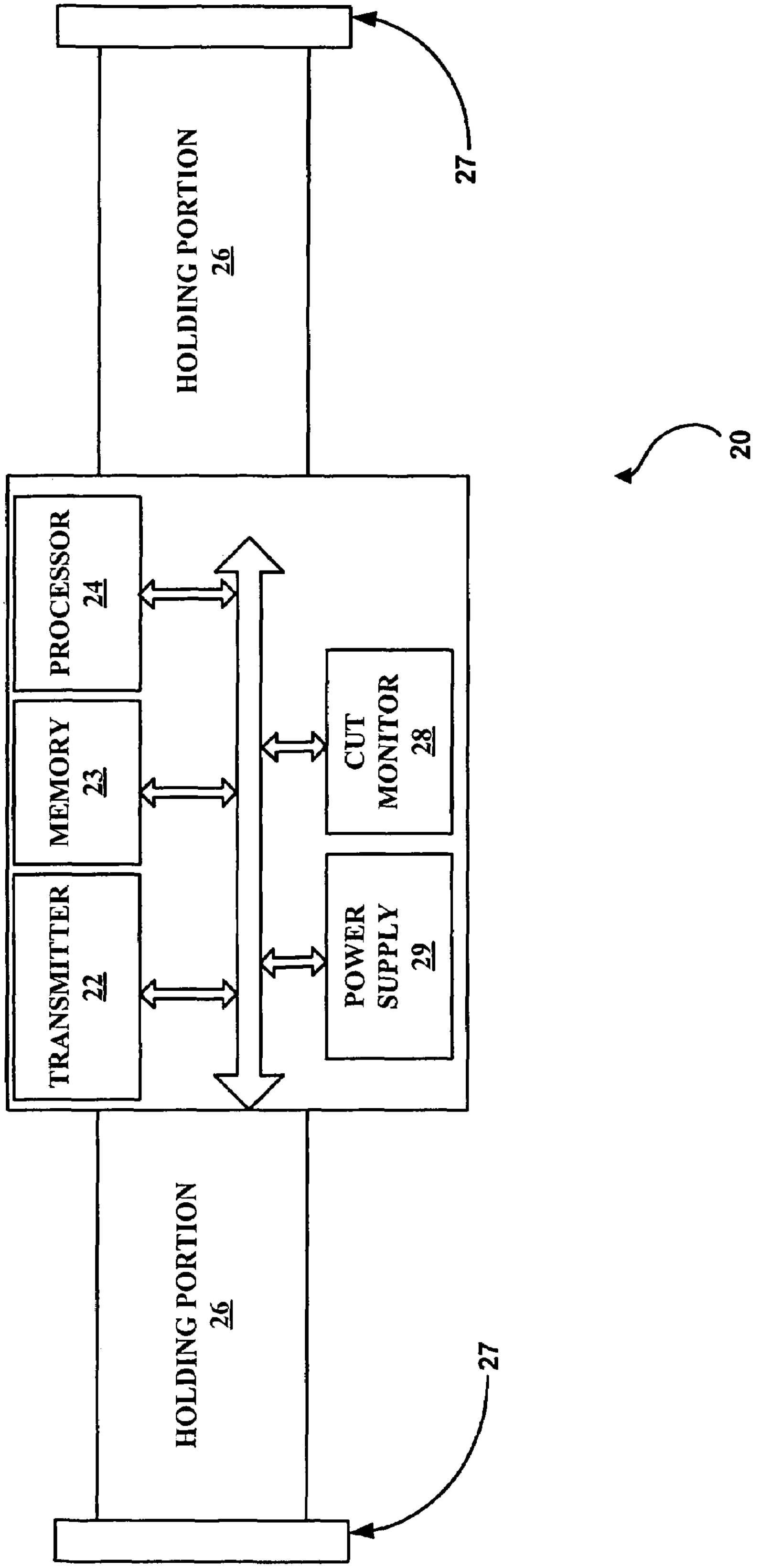
FIG. 2 is a block diagram further illustrating the monitoring band of FIG. 1.

FIG. 2 is a block diagram further illustrating the monitoring band 20 of FIG. 1. As is shown by FIG. 2, the monitoring band 20 contains a transmitter 22, a memory 23, a processor 24, a cut monitor 28, a power supply 29, and a local interface 25, where the local interface 25 allows communication between the different portions of the monitoring band 20, as is explained in detail below. The monitoring band 20 also contains a holding portion 26 for allowing the monitoring band 20 to be secured to the baby 30. The holding portion 26 may be made of any material that is capable allowing the holding portion 26 to be secured to the baby 30. As an example, the holding portion 26 may be made of an elastic material or a plastic material. In addition, it is preferred that the holding portion 26 have a securing mechanism 27 thereon for purposes of ensuring that the monitoring band 20 does not fall off of the baby 30 unintentionally.

In accordance with the first exemplary embodiment of the invention, the cut monitor 28 is capable of determining if the monitoring band 20 has been cut. As an example, the cut monitor 28 may monitor the monitoring band 20 by ensuring conductance within a wire that traverses the entire holding portion 26, and through the securing mechanism 27, of the monitoring band 20. Therefore, when the securing mechanism 27 is closed (i.e., the monitoring band 20 is secured to the baby 30), the cut monitor 28 transmits a small current through the wire (not shown) and determines if the small current is received back at the cut monitor 28. Therefore, if the monitoring band 20 is cut, the transmitted small current will not be received by cut monitor 28. If the cut monitor 28 determines that the monitoring band 20 has been cut, the cut monitor 28 creates a cut-band signal for transmission by the transmitter 22 to the TIU 50. The cut-band signal may be a data packet having a header containing information capable of being interpreted by both the TIU 50 and the monitoring station 100 as a cut-band signal. As is known by those having ordinary skill in the art, a header of a data packet is a portion of the data packet containing certain information that the transmitter of the data packet wishes to transmit to a receiver of the data packet. The receiver of the data packet then typically reviews the header of the data packet prior to utilizing the data within the data packet.

The transmitter 22 is capable of transmitting a wireless signal to a remote location. Specifically, in accordance with the first exemplary embodiment of the invention, the transmitter 22 is capable of wirelessly transmitting a data packet to the TIU 50. Preferably, the data packet contains a header having stored therein a unique identification that identifies the monitoring band 20. As an example, the unique identification may be an identification number. It should be noted that other information may be stored within the header, such as the name of the baby being monitored. In addition, information for the header may be stored within the memory 23, as is further described below.

The memory 23 located within the monitoring band 20 has the unique identification stored therein. In addition, the monitoring band 20 may have a clock connected to the memory 23 so that the memory 23, via the processor 24 and the transmitter 22, is capable of transmitting the data packet having the unique identification of the monitoring band 20 within the header, to the TIU 50 after a predefined period of time (i.e., polling). As an example, the data packet having the unique identification may be transmitted every ten seconds. In fact, for exemplary purposes, the present description assumes that the data packet having the unique identification is transmitted by the transmitter 22, from the memory 23, every ten seconds.

Since wireless transmitters, such as the transmitter 22 located within the monitoring band 20, typically consume a large amount of power, in accordance with a second exemplary embodiment of the invention, the transmitter 22 may have a motion detector (not shown), as is explained in detail below. The motion detector is capable of shutting down or decreasing power from the power supply 29 to the transmitter 22. Specifically, a switch (not shown) located within the motion detector is capable of determining when the baby 30 is moving or is being moved. If a predetermined time period passes without the baby 30 moving, the motion detector prevents or decreases power from the power supply 29 to the transmitter 22, thereby essentially shutting down the transmitter 22. Since wireless transmitters require a fairly large amount of power to maintain the capability of wirelessly transmitting signals, use of the motion detector for regulating power consumption by the monitoring band 20 allows a smaller power supply 29 to be used, thereby decreasing size and weight of the monitoring band 20.

Figure 3:
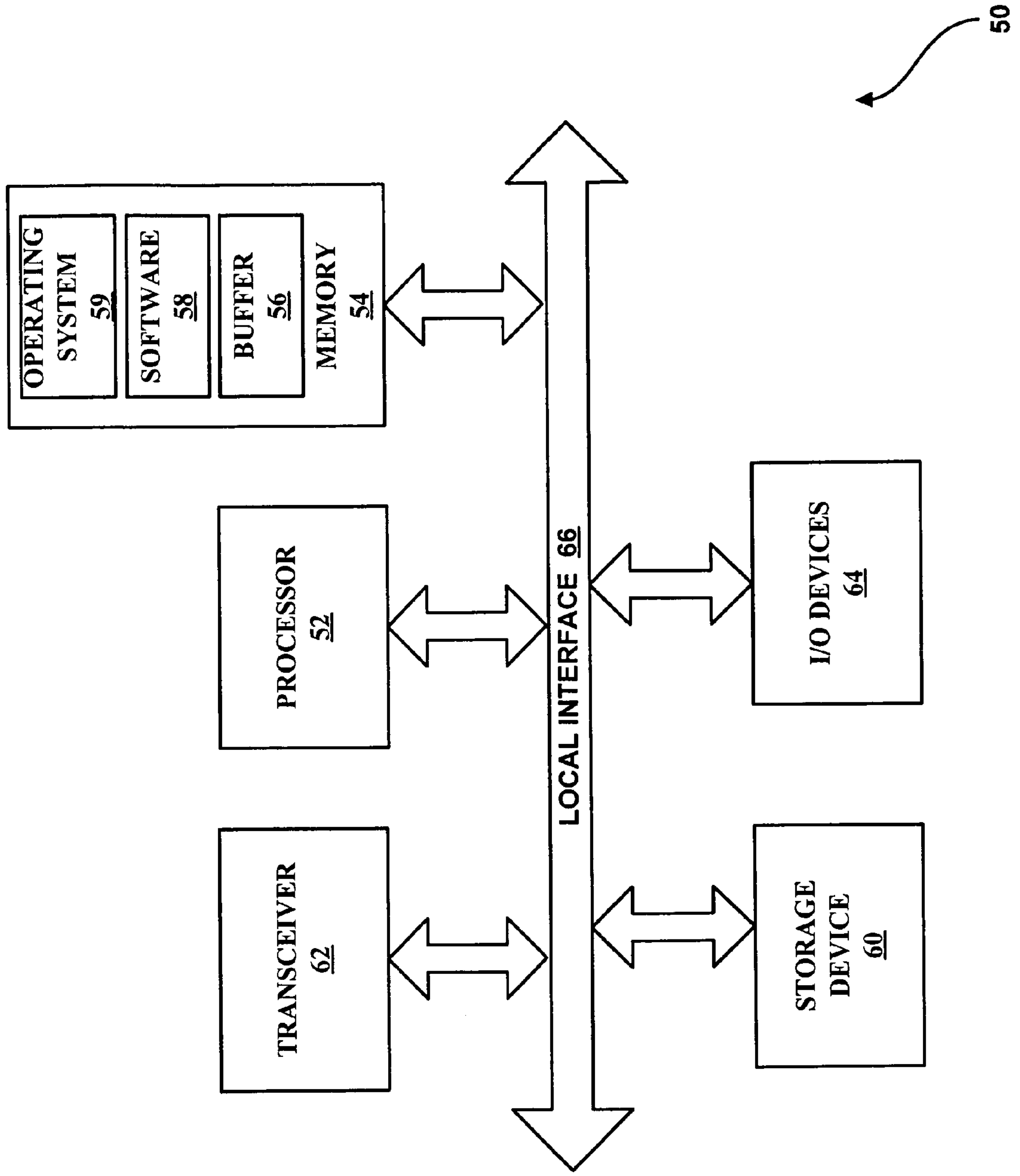
FIG. 3 is a block diagram further illustrating the transceiver interface unit of FIG. 1.

FIG. 3 is a block diagram further illustrating the TIU 50 of FIG. 1. The TIU 50 can be implemented in software (e.g., firmware), hardware, or a combination thereof. In the currently contemplated best mode, the TIU 50 is implemented partially in hardware and partially in software, as an executable program, and is executed by a special or general purpose digital computer, such as a personal computer (PC;

IBM-compatible, Apple-compatible, or otherwise), workstation, minicomputer, or mainframe computer. An example of a general purpose computer that can perform functions of the TIU 50 is shown in FIG. 3.

Generally, in terms of hardware architecture, as shown in FIG. 3, the TIU 50 includes a processor 52, a memory 54 having software 58 therein, a storage device 60, a transceiver 62, and one or more input and/or output (I/O) devices 64 (or peripherals) that are communicatively coupled via a local interface 66. The TIU 50 may also have an internal clock (not shown) that is used for timing purposes described herein. The local interface 66 can be, for example but not limited to, one or more buses or other wired or wireless connections, as is known in the art. The local interface 66 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The storage device 60 is capable of having data stored therein. As an example, in accordance with the first exemplary embodiment of the invention, the data may be a range of unique identifications of monitoring bands 20 that the TIU 50 is capable of monitoring. It should be noted that, as has been mentioned above, the header of a transmitted data packet is examined by the TIU 50 to determine if the data packet is associated with a polling signal or a cut-band signal. Specifically, data within the header will identify the signal as being either a polling signal or a cut-band signal. This analysis may be performed by the processor 52 in accordance with functionality defined by the software 58.

The processor 52 is a hardware device for executing software 58, particularly that stored in the memory 54. The processor 52 can be any custom made or commercially available processor, a central processing unit (CPU), an auxiliary processor among several processors associated with the computer, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 54 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 54 may incorporate electronic, magnetic, optical, and/or other types of storage media. Note that the memory 54 can have a distributed architecture, where various components are situated remote from one another, but can be accessed by the processor 52. As is shown by FIG. 3 the memory 54 also contains a buffer 56, otherwise known as a designated series of memory cells. The buffer 56 is capable of temporarily storing received data packets, as is explained in detail below with regard to FIG. 5. Specifically, the buffer 56 temporarily stores received data packets if they are received from polling signals. In addition, a data packet that is received from a cut-band signal is forwarded to the monitoring station 100 without being delayed by the TIU 50 (i.e., temporarily stored within the buffer 56).

In accordance with the first exemplary embodiment of the invention, after a predefined period of time, the buffer 56 within the memory 54 is capable of being "flushed", where all data packets temporarily stored within the buffer 56 are transmitted to the monitoring station 100 at the same time. The abovementioned is explained in further detail below with regard to FIG. 5.

The software 58 in the memory 54 may include one or more separate programs, each of which comprises an ordered listing of executable instructions for implementing logical functions. In the example of FIG. 3, the software 58 in the memory 54 defines the functionality performed by the TIU 50 in accordance with the present invention. A suitable operating system (O/S) 59 may also be stored within the memory 54. A nonexhaustive list of examples of suitable commercially available operating systems 59 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system 59 essentially controls the execution of other computer programs, such as that defined by the software 58 of the TIU 50, and provides scheduling, input-output control, file and data management, memory management, and communication control and related services.

The I/O devices 64 may include input devices, for example but not limited to, a keyboard, mouse, scanner, microphone, or other input devices. Furthermore, the I/O devices 64 may also include output devices, for example but not limited to, a printer, display, or other output devices. Finally, the I/O devices 64 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

When the TIU 50 is in operation, the processor 52 is configured to execute the software 58 stored within the memory 54, to communicate data to and from the memory 54, and to generally control operations of the TIU 50 pursuant to the software 58. The software 58 and the O/S 59, in whole or in part, but typically the latter, are read by the processor 52, perhaps buffered within the processor 52, and then executed.

When a portion of the TIU 50 is implemented in software, as is shown in FIG. 3, it should be noted that the a portion of the TIU 50 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The TIU 50 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the TIU 50 is implemented entirely in hardware, the TIU 50 can be implemented with any or a combination of the following technologies, which are each well known in the art: a discrete logic circuit(s) having logic gates for implementing logic functions upon data signals; an application specific integrated circuit (ASIC) having appropriate combinational logic gates; a programmable gate array(s) (PGA); and a field programmable gate array (FPGA), among others.

Figure 4:
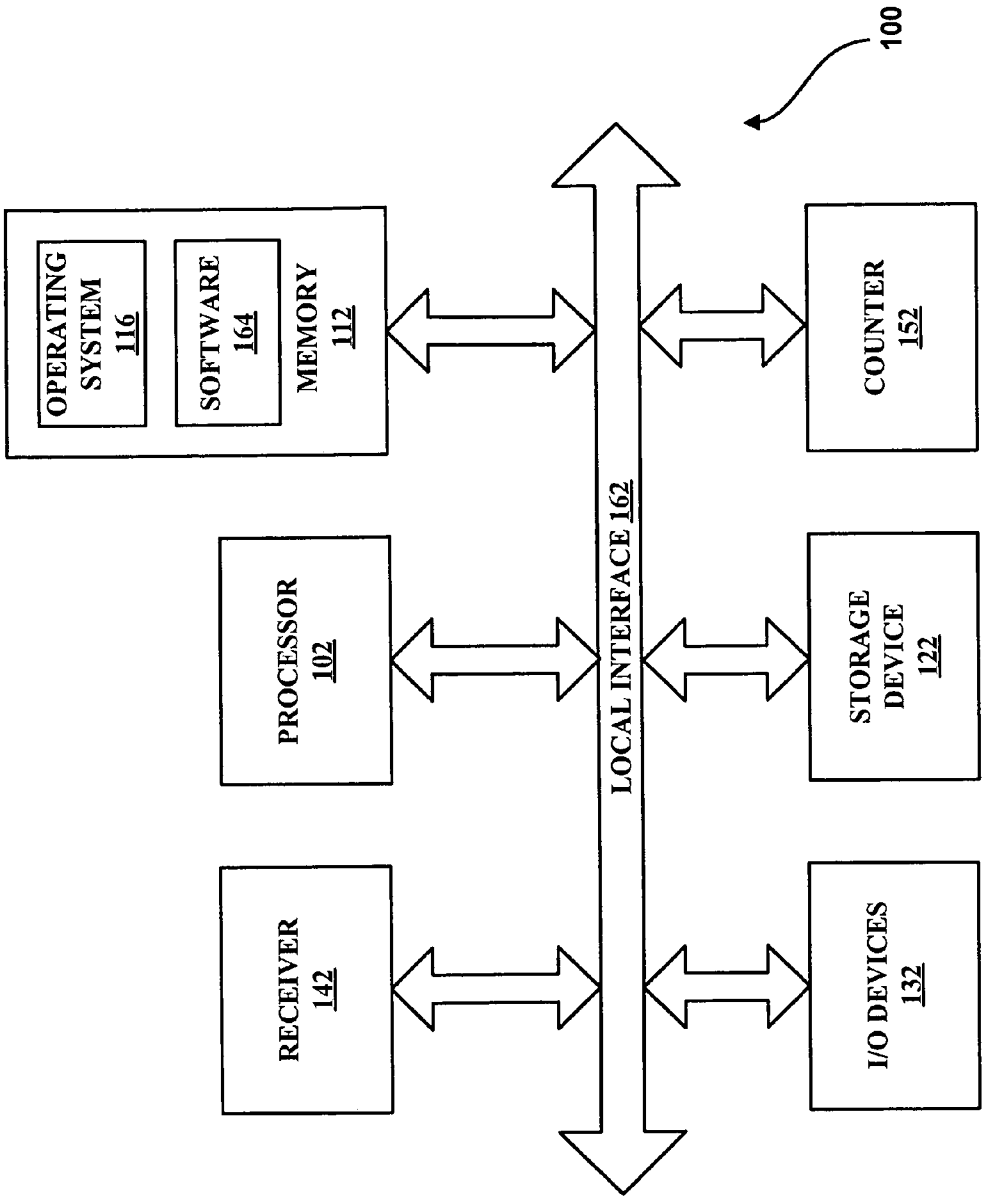
FIG. 4 is a block diagram further illustrating the monitoring station of FIG. 1.

FIG. 4 is a block diagram further illustrating the monitoring station 100 of FIG. 1. The monitoring station 100 of FIG. 1 has a structure that is similar to the structure of the TIU 50 of FIG. 3. As is shown by FIG. 4, the monitoring station 100 contains a processor 102, a memory 112 having software 114 and an operating system 116 therein, a storage device 122, I/O devices 132, a receiver 142, a counter 152, and a local interface 162. The monitoring station 100 may also have an internal clock (not shown) that is used for timing purposes described herein. The receiver 142 is capable of receiving polling signals and cut-band signals transmitted by the TIU 50. Each device located within the monitoring station 100 works in a manner similar to that of devices located within the TIU 50. Differences between similar devices located within the monitoring station 100 and the TIU 50 are described herein.

The storage device 122 is capable of storing unique identifications therein and a number of times that a polling signal having that unique identification has been received by the monitoring station 100. Therefore, if a polling signal from a specific monitoring band 20 has been received twice, the unique identification of the monitoring band 20 and a count of two is stored within the storage device 122.

The software 114 stored within the memory 112 defines functionality performed by the monitoring station 100. Specifically, as is explained in detail with regard to FIG. 6, the monitoring station 100 is required to receive a polling signal from a specific monitoring band 20, via the TIU 50, a predefined number of times before the monitoring station 100 begins monitoring the monitoring band 20. The counter 152 may be used to increase the count that is stored with the unique identification within the storage device 122. In addition, if the monitoring station 100 receives a cut-band signal, the monitoring station 100 is capable of knowing that the cut-band signal has been received, by analyzing the header of an associated data packet, and thereafter, sounds an alarm. Therefore, in accordance with the first exemplary embodiment of the invention, the I/O devices 132 include at least an alarm and a monitor. Use of the alarm and monitor is explained in detail below.

Monitoring of a monitoring band 20 entails ensuring that a polling signal is received from the monitoring band 20 at least once within a predefined period of time. If a polling signal is not received from the monitoring band 20 at least once within the predefined period of time, an alarm may sound, thereby signifying that the monitoring band 20 is no longer being detected by the TIU 50. Since a polling signal would be received by the TIU 50, from the monitoring band 20, if the monitoring band 20 was functional and the baby 30 was within the monitored maternity ward, lack of receiving the polling signal during monitoring of the monitoring band 20 may mean that the baby 30 has been moved out of range of the TIU 50 transceiver 62 (i.e., the baby 30 has been taken out of the maternity ward). In addition, during monitoring of the monitoring band 20, the unique identification, the name of the baby 30, or any other specified data may be displayed if a polling signal is not received from the monitoring band 20 at least once within the predefined period of time.

Figure 5:
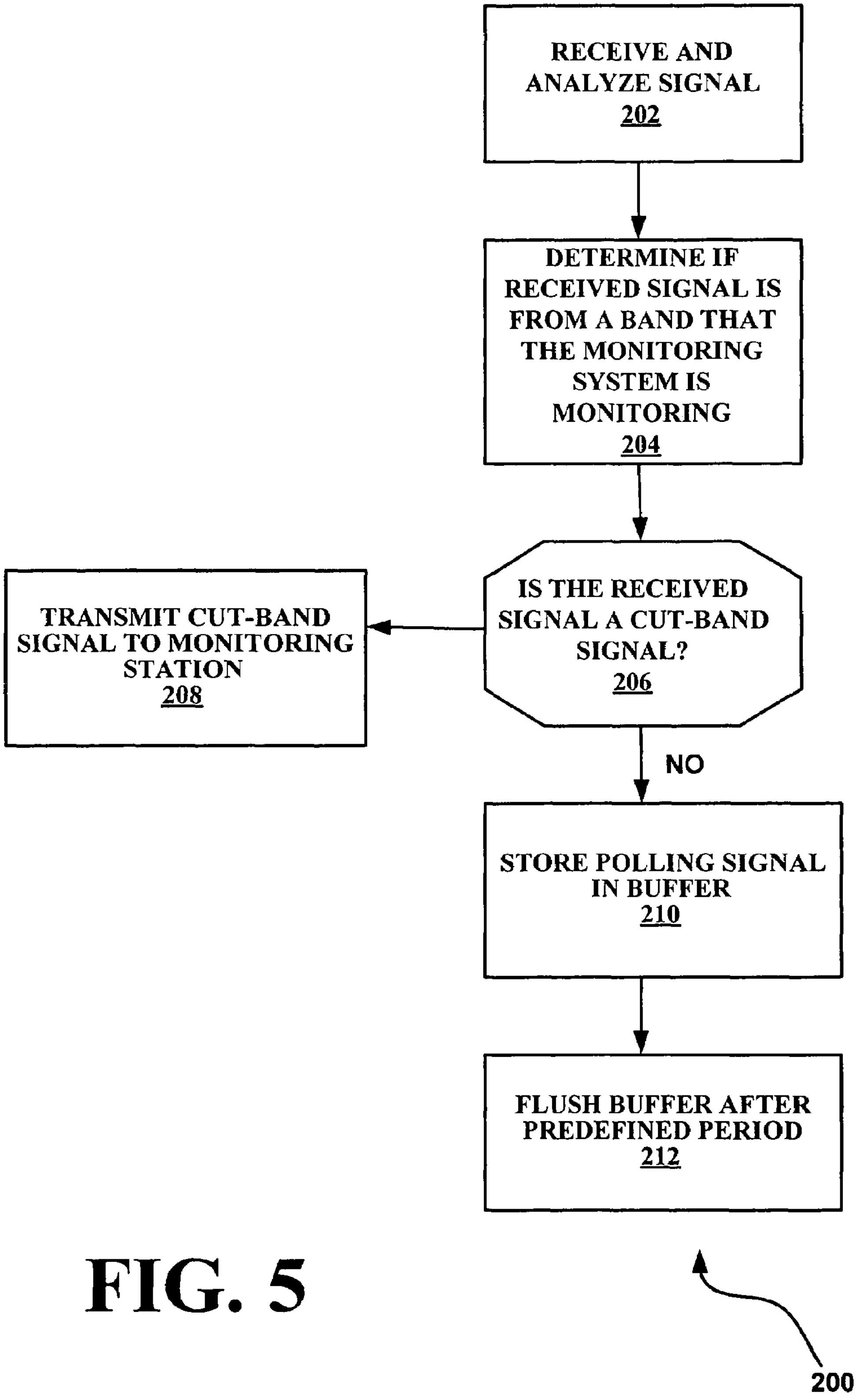
FIG. 5 is a flowchart illustrating steps taken by the transceiver interface unit of FIG. 3, in accordance with the first exemplary embodiment of the invention.

FIG. 5 is a flowchart 200 illustrating steps taken by the TIU 50 of FIG. 3, in accordance with the first exemplary embodiment of the invention. It should be noted that any process descriptions or blocks in flowcharts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 202, a signal is received and analyzed by the TIU 50. As has been mentioned above, a received signal may contain at least one data packet, where a header of the data packet contains a unique identification and data signifying whether the associated signal is a polling signal or a cut-band signal. The unique identification and data signifying whether the associated signal is a polling signal or a cut-band signal is reviewed during analysis of the data packet header. As is shown by block 204, the unique identification (e.g., an identification number) is searched within the storage device 60 of the TIU 50 to determine if the received signal is from a monitoring band 20 that the monitoring system 10 should be monitoring. Specifically, the storage device 60 may have a range of unique identifications of monitoring band 20 that the TIU 50 is capable of monitoring, stored within the storage device 60.

The TIU 50 then determines if the received signal was a cut-band signal by reviewing the header of the data packet (206). If the received signal is a cut-band signal, the received cut-band signal is immediately transmitted to the monitoring station 100 (block 208) via the transceiver 62. If, however, the received signal is a polling signal, as determined from the header of the received data packet, the polling signal is stored within the buffer 56 of the memory 54 (block 210). It should be noted, that if the TIU 50 is being used within a monitoring system 10 that is monitoring more than one monitoring band 20, polling signals from numerous different monitoring bands 20 may be stored within the buffer 56. Storage of polling signals from monitoring bands 20, within the buffer 56, is preferably performed in a first-in, first-out sequence. Specifically, a first received polling signal would be the first polling signal to be transmitted from the TIU 50 to the monitoring station 100 when polling signals are released from the buffer 56 (i.e., the buffer is "flushed").

As is shown by block 212, after a predefined period of time, polling signals stored within the buffer 56 of the memory 54 are transmitted by the transceiver 62 to the monitoring station 100, at the same time. The transmitting of all polling signals stored within the buffer 56 of the memory 54 to the monitoring station 100, at the same time, and in predefined intervals, is referred to herein as "flushing" the buffer 56. As an example, the buffer 56 may be "flushed" every thirty-five seconds. Of course, the predefined period between "flushing" of the buffer 56 may be more or less than thirty-five seconds. Thirty-five seconds has merely been selected for exemplary purposes.

Figure 6:
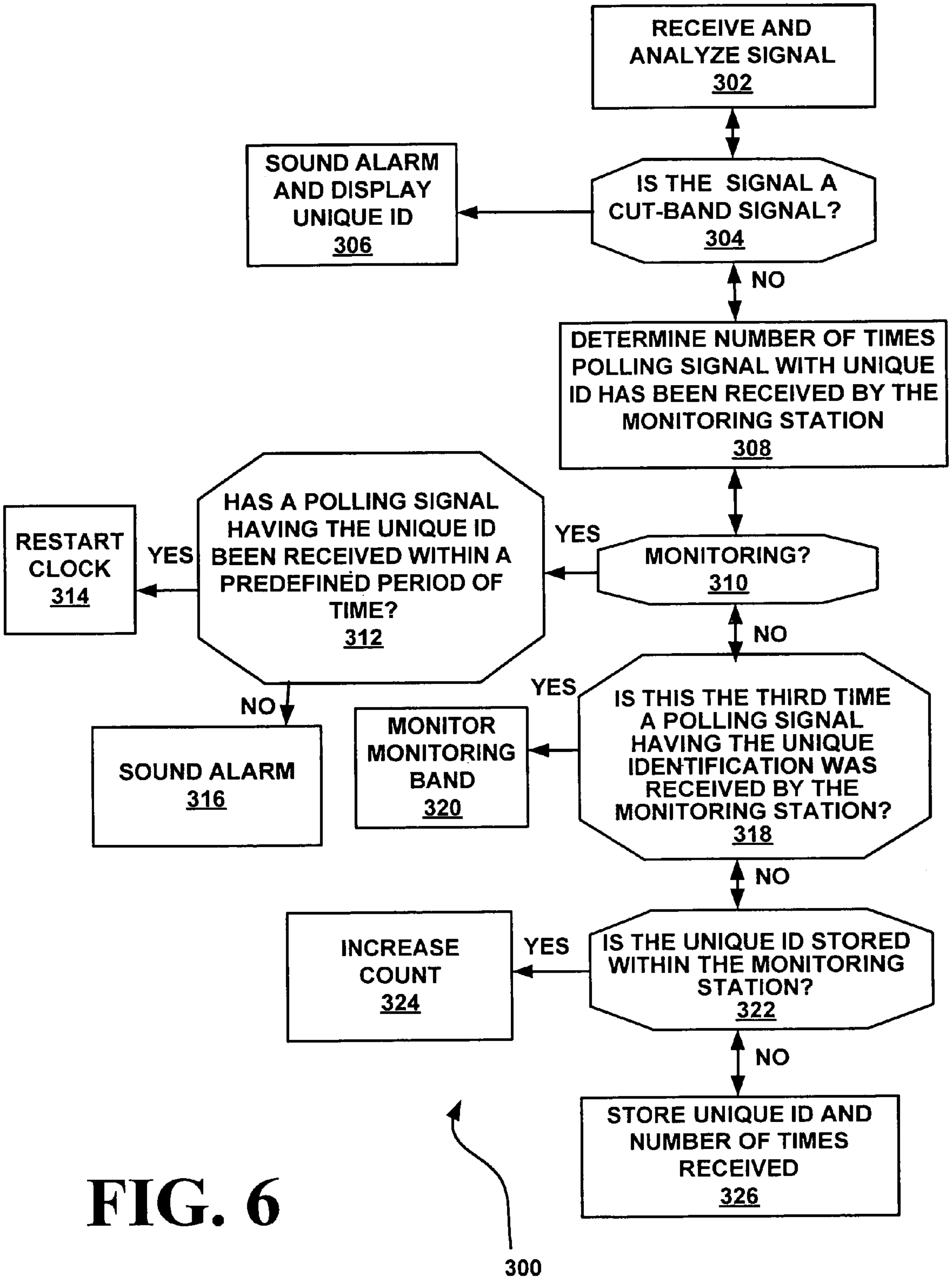
FIG. 6 is a flowchart illustrating steps taken by the monitoring station of FIG. 4, in accordance with the first exemplary embodiment of the invention.

FIG. 6 is a flowchart 300 illustrating steps taken by the monitoring station 100 of FIG. 4, in accordance with the first exemplary embodiment of the invention. As is shown by block 302, a signal is received and analyzed by the monitoring station 100. As with the TIU 50, the monitoring station 100 analyzes the received signal by analyzing a header of a data packet associated with the received signal. During analysis of the header of the data packet, the monitoring station 100 is capable of reviewing information regarding whether the received signal is a polling signal or a cut-band signal. In addition, the unique identification of the monitoring band 20 is also received by analyzing the header of the data packet.

By reviewing results of analysis of the data packet header (block 302), the monitoring station 100 then determines if the received signal is a cut-band signal (block 304). If the received signal is a cut-band signal, the monitoring station 100 sounds an alarm and displays the unique identification so that a user of the monitoring station 100 may be immediately informed as to cutting of the monitoring band 20 from the baby 30. It should be noted that events performed by the monitoring station 100 as a result of receiving a cut-band signal, may differ from those described herein. As an example, the monitoring station 100 may only sound an alarm, or authorities within the maternity ward may be notified of the cut-band occurrence in a different manner. Alternatively, receipt of the cut-band signal may result in locking of doors to the maternity ward.

If the received signal is not a cut-band signal, the received signal is instead a polling signal. The monitoring station 100 then determines a number of times that a polling signal having the same unique identification as the received polling signal, has been received by the monitoring station 100 (block 308). The determination of the number of times that polling signals with the unique identification has been received may be performed by searching for the unique identification within the storage device 122 of the monitoring station 100 and reviewing the count associated with the unique identification. As has been mentioned above, the count associated with the unique identification represents a number of times that a polling signal having a unique identification has been received by the monitoring station 100.

A determination is then made as to whether the monitoring station 100 is monitoring the monitoring band 20 (block 310). If the monitoring station 100 is monitoring the monitoring band 20, the monitoring station 100 determines if a polling signal having the unique identification has been received within a predefined period of time (block 312). If the polling signal has been received by the monitoring station 100 within the predefined period of time, the monitoring station 100 notes that the polling signal has been received within the predefined period of time, restarts a clock, and continues monitoring the monitoring band 20 (block 314). Alternatively, if the polling signal has not been received by the monitoring station 100 within the predefined period of time, the monitoring station 100 sounds an alarm (block 316).

It should be noted that when the monitoring station 100 is monitoring a monitoring band 20, the monitoring station 100 continuously determines if a polling signal has been received from the monitoring band 20 within the predefined period of time. If a polling signal is received within the predefined period of time, the clock of the monitoring system 100 is restarted. If a polling signal has not been received from the monitoring band 20 within the predefined period of time (i.e., the monitoring station 100 does not receive a polling signal having a data packet with a header that has a unique identification associated with the monitoring band 20), the monitoring station 100 sounds an alarm, thereby signifying that either, the monitoring band 20 is no longer being detected by the TIU 50, the monitoring band 20 is not working properly, the TIU 50 is not communicating with the monitoring station 100 properly, or the monitoring station 100 is not working properly. As an example, lack of receiving the polling signal may be due to the baby 30 having been taken from the maternity ward. In any case, sounding of the alarm immediately alerts authorities as to the need for finding the baby 30 and ensuring that all portions of the monitoring system 100 are working properly. It should be noted that the unique identification, the name of the baby 30, or any other specified information may be displayed along with sounding of the alarm.

If the monitoring station 100 is not monitoring the monitoring band 20, a determination is then made as to whether this is the third time that a polling signal having the unique identification was received by the monitoring station 100 (block 318). If this is the third time that a polling signal having the unique identification has been received by the monitoring station 100, the monitoring station 100 begins monitoring of the monitoring band 20 (block 320), as explained above. Alternatively, if this is not the third time that a polling signal having the unique identification was received by the monitoring station 100, the monitoring station 100 determines if the unique identification from the polling signal is stored within the monitoring station 100 (block 322). Specifically, the unique identification is searched for within the storage device 122 of the monitoring station 100.

If the unique identification is stored within the monitoring station 100, the counter 152 increases the count associated with the stored unique identification within the storage device 122 (block 324). If, however, the unique identification is not stored within the monitoring station 100 the unique identification and a number of times that the unique identification has been received is stored within the storage device 122 (block 326).

It should be noted that the numerous different signals described herein may be transmitted at different frequencies or the same frequencies.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A system for ensuring location of an individual or an object within a designated area, comprising:

a monitoring band having a transmitter capable of transmitting a signal;

a transceiver interface unit capable of receiving the signal and determining if the signal is a signal indicating that said monitoring band has been cut, hereafter referred to as a cut-band signal, or a signal indicating that said monitoring band is functional, hereafter referred to as a polling signal;

a monitoring station capable of performing an event if said monitoring station receives said cut-band signal, or, if said monitoring station is monitoring said monitoring band, performing said event if said polling signal is not received by said monitoring station within a predefined period of time; and a receiver;

a counter capable of increasing a count in accordance with a number of times that a polling signal having a unique identification is received by said monitoring station; and a storage device for storing said unique identification and said count.

2. The system of claim 1, wherein said signal transmitted by said monitoring band is said cut-band signal if said monitoring band has been cut, and said polling signal if said monitoring band is transmitting said signal as an indication that said monitoring band is functional.

3. The system of claim 2, wherein said monitoring band further comprises a cut monitor that is capable of determining if said monitoring band has been cut by determining if a voltage transmitted through a length of said monitoring band is received back at said cut monitor.

4. The system of claim 1, wherein said signal contains a data packet having a header, and wherein said header has a unique identification of said monitoring band stored therein.

5. The system of claim 4, wherein said header also contains data indicating whether said signal is a cut-band signal or a polling signal.

6. The system of claim 1, wherein said event is sounding of an alarm.

7. The system of claim 1, wherein said monitoring band further comprises:

a power supply; and a motion sensor, wherein power to said transmitter is decreased if said motion sensor determines that there is a lack of motion of said individual or object over a predefined period of time.

8. The system of claim 1, wherein said transceiver interface unit further comprises a buffer for temporarily storing said polling signal.

9. The system of claim 1, wherein said monitoring band is capable of producing a polling signal for transmission by said transmitter in accordance with a predefined polling signal transmission schedule.

10. A method of ensuring location of an individual or an object within a designated area, comprising the steps of:

determining if a received signal is a signal indicating that a monitoring band attached to said individual or object has been cut, hereafter referred to as a cut-band signal, or if said received signal is a signal indicating that said monitoring band is functional, hereafter referred to as a received polling signal;

notifying authorities if said received signal is a cut-band signal;

determining a number of times that a polling signal having a unique identification similar to a unique identification stored within said received polling signal, has been received, if said received signal is a received polling signal;

monitoring said monitoring band for a polling signal having said unique identification, if said number of times that a polling signal having said unique identification exceeds a predefined number; and notifying said authorities if a polling signal having said stored unique identification is not received within a predefined period of time, if monitoring said monitoring band.

11. The method of claim 10, wherein said monitoring of said monitoring band is performed after receiving a predefined number of polling signals having the same unique identification.

12. The method of claim 10, wherein said step of notifying said authorities further comprises the steps of:

sounding an alarm; and displaying said unique identification.

13. The method of claim 10, further comprising the step of maintaining a count of a number of times that a polling signal having a unique identification has been received.

14. A method of ensuring location of an individual or apparatus within a designated area, comprising the steps of:

receiving a signal;

determining if said signal is a cut-band signal, wherein said cut-band signal signifies that a monitoring band has been cut, or a polling signal, wherein said polling signal is a signal indicating that said monitoring band is functional;

immediately transmitting a received cut-band signal to a remote location;

temporarily storing a received polling signal;

determining a number of times that a polling signal having a unique identification similar to a unique identification stored within said received rolling signal, has been recieved, if said received signal is a received polling signal; and transmitting all stored polling signals to said remote location at a predetermined time.

15. The method of claim 14, further comprising the step of determining if said received signal is from a monitored monitoring band.

16. The method of claim 15, wherein said step of determining if said received signal is from a monitored monitoring band further comprises the step of searching for a unique identification received from said received signal.

17. A system for ensuring location of an individual or an object within a designated area, comprising the steps of:

means for determining if a received signal is a signal indicating that a monitoring band attached to said individual or object has been cut, hereafter referred to as a cut-band signal, or if said received signal is a signal indicating that said monitoring band is functional, hereafter referred to as a received polling signal;

means for determining a number of times that a polling signal having a unique identification similar to a unique identification stored within said received polling signal has been received, if said received signal is a received polling signal;

means for notifying authorities if said received signal is a cut-band signal and for notifying said authorities if a polling signal having said stored unique identification is not received within a predefined period of time, if monitoring said monitoring band; and means for monitoring said monitoring band for a polling signal having said unique identification, if said number of times that a polling signal having said unique identification exceeds a predefined number.

18. A method of ensuring location of an individual or an object within a designated area, comprising the steps of:

determining if a received signal is a signal indicating that a monitoring band attached to said individual or object has been cut, hereafter referred to as a cut-band signal, or if said received signal is a signal indicating that said monitoring band is functional, hereafter referred to as a received polling signal;

determining a number of times that a polling signal having a unique identification similar to a unique identification stored within said received polling signal, has been received, if said received signal is a received polling signal; and monitoring said monitoring band for a polling signal having said unique identification, if said number of times that a polling signal having said unique identification exceeds a predefined number.

* * * * *